Feb. 13, 1923.

W. L. BUSWELL

FLYING MACHINE

Filed July 9, 1920

WITNESSES

INVENTOR
William L. Buswell
BY
ATTORNEYS

Feb. 13, 1923.

W. L. BUSWELL 1,445,128

FLYING MACHINE

Filed July 9, 1920  10 sheets-sheet 7

W. L. BUSWELL

FLYING MACHINE

Filed July 9, 1920

WITNESSES

INVENTOR
William L. Buswell
BY
ATTORNEYS

Feb. 13, 1923.

W. L. BUSWELL

FLYING MACHINE

Filed July 9, 1920

Patented Feb. 13, 1923.

1,445,128

UNITED STATES PATENT OFFICE.

WILLIAM LOUIS BUSWELL, OF AMARILLO, TEXAS.

FLYING MACHINE.

Application filed July 9, 1920. Serial No. 395,090.

*To all whom it may concern:*

Be it known that I, WILLIAM LOUIS BUSWELL, a citizen of the United States, and resident of Amarillo, in the county of Potter and State of Texas, have invented a new and Improved Flying Machine, of which the following is a full, clear, and exact description.

In connection with aeroplanes, it is a well appreciated fact that much has been left to be desired in their propulsion and operation.

Numerous attempts have been made with a view of producing a manually operated "heavier than air" machine, but these attempts have for the most part been entirely unsuccessful, in view of the fact that the operator was unable to overcome the inertia of the plane, and acquire sufficient momentum to permit of the plane rising from the ground.

A further defect in this connection, has been that the proposed devices have, for the most part, relied upon a screw propeller for their tractive force, and it has been impossible for the operator to revolve the propeller with sufficient energy to produce a pull equal to overcome the inertia, and to permit the acquisition of sufficient momentum to allow the machine to rise from the ground.

In aeroplanes, general "banking" has been controlled by ailerons, which are often sluggish in response, aside from the fact that a great strain is placed upon the wings in twisting the same out of its normal plane by means of the ailerons.

The same might be said with respect to the elevating rudders, as applied to the tail of an airplane, in that these members serve to raise or lower the entire rear end of the fuselage.

It will be appreciated that the most ideal type of aeroplane will be one which would, as nearly as possible, simulate the action of a bird, i. e. one in which the wings, considering that a right "bank" is intended, would be positioned so that the left wing is depressed and the right wing elevated.

Also it is well known that birds when desiring to incline or decline their flight, utilize the entire tail for this purpose, varying the angle of the same with respect to the body.

Further, the wings, instead of being rigid with respect to the body, as is the case in present day aeroplanes, move downwardly and rearwardly to give a forward push, and being subsequently inclined upwardly and moved forwardly.

Having the defects of a manually operated aeroplane in mind, I have constructed a "heavier than air" machine, by means of which it will be possible for an operator to operate the same entirely independent of a mechanical device unit, although this may be resorted to if this action is desired.

An object of my invention, is the construction of an aeroplane which shall be propelled by bodily moving the wings to duplicate as nearly as possible, the wing action of a bird.

A further object of my invention is the construction of a device of this nature in which the angle of the wings may be varied, so that the inertia of a machine may be overcome, and sufficient momentum may be acquired prior to the inclination of the wings, to permit of a ready "taking off."

A still further object of my invention is the construction of an aeroplane, in which the wings may be moved out of a horizontal plane so as to effect a natural "banking" without the strains incident to the use of ailerons.

Another object of my invention is the construction of a "heavier than air" machine in which the action produced by the elevators of a conventional machine will be duplicated by means of which a more ready response of the machine will be effected, by virture of the fact that the entire rear portion of the fuselage or tail is capable of moving in the manner of a bird in flight, so as to produce the result desired.

Further objects of my invention will appear in the annexed specification and drawings, in which latter—

Figure 13 is an enlarged sectional view of a certain detail of the mechanism permitting a moving of the wings.

Figure 1:
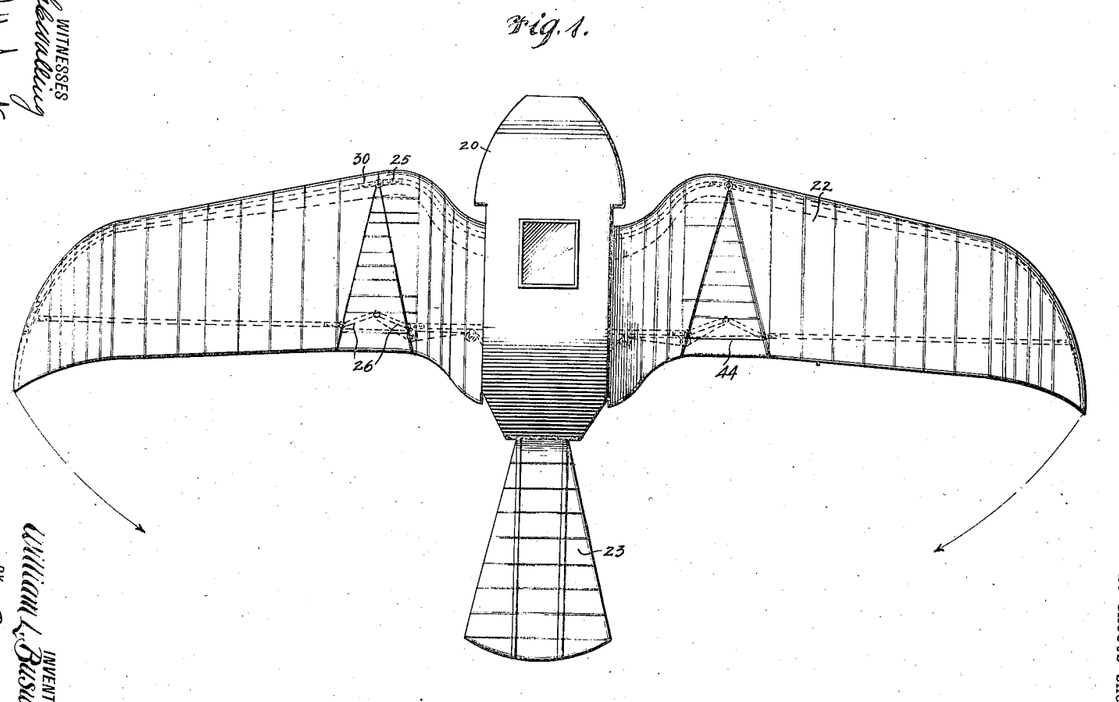
Figure 1 is a plan view of a machine constructed in accordance with my invention.

Referring now more particularly to Figure 1, it will be seen that the reference numeral 20 designates a fuselage of any desirable type, which has a landing gear, preferably including three wheels, 21, two of these being positioned adjacent the forward end of the fuselage, and a third one being preferably associated to the rear end thereof, for a purpose hereinafter more fully specified. Attached to the fuselage are wings 22, and a tail 23, the action of which will be hereinafter more fully set forth.

Figure 8:
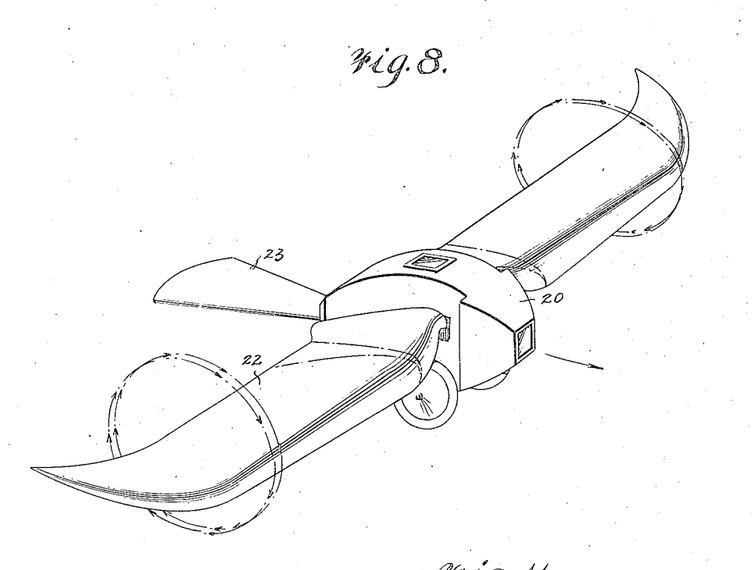
Figure 8 is a perspective view of the machine showing the action of the parts while in flight.
Figure 9:
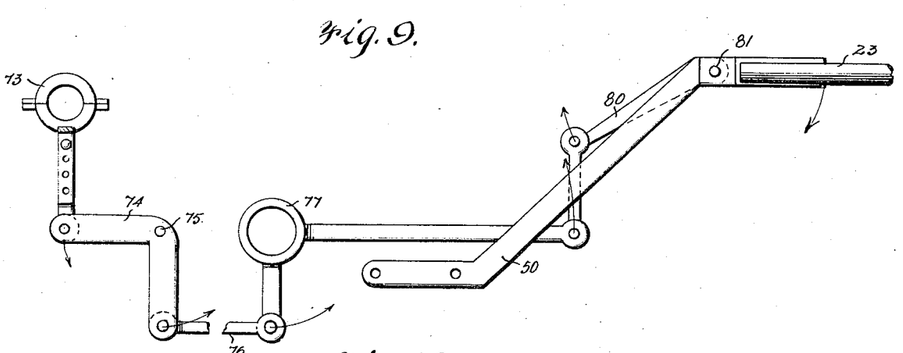
Figures 9 and 10 are side and plan views respectively of the controlling mechanism for the elevating parts of the machine.
Figure 10:
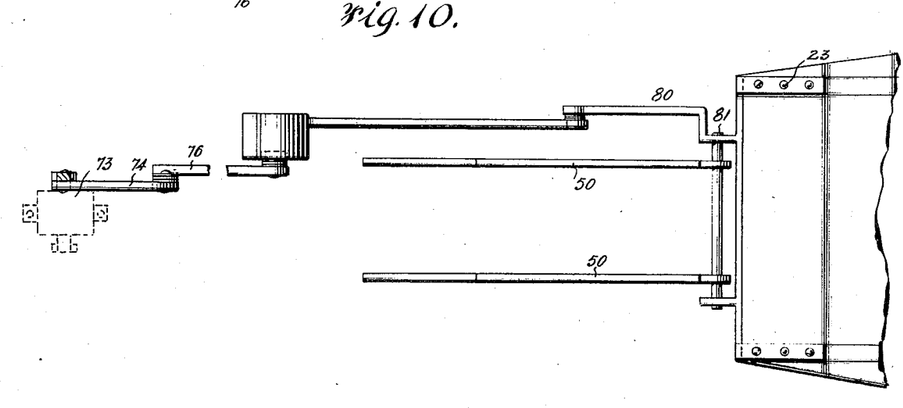
Figure 11:
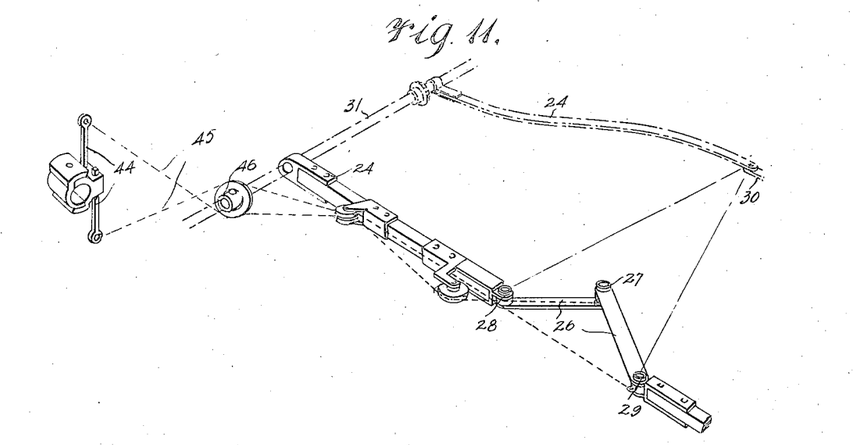
Figure 11 is a perspective view of certain of the wing operating mechanism.
Figure 12:
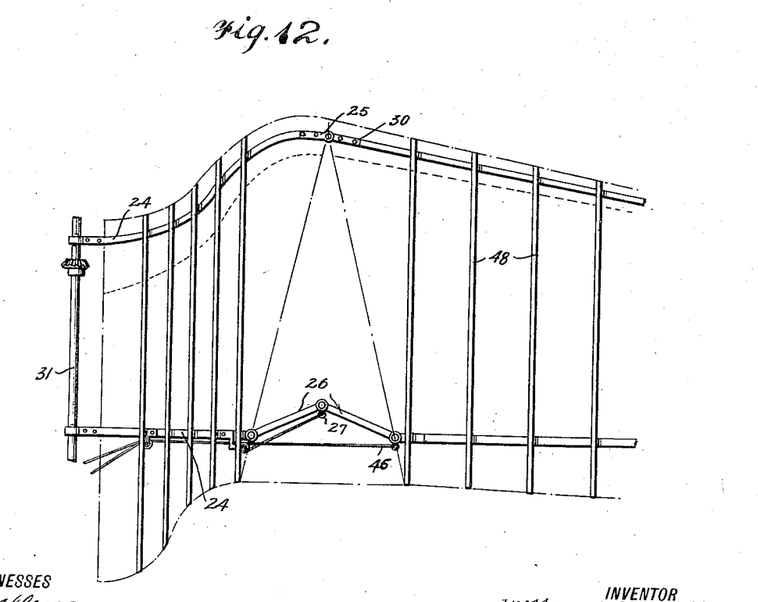
Figure 12 is a plan view of the parts as illustrated in Figure 11 and showing a wing applied thereto.

Referring now more particularly to Figure 8 which illustrates the action of the wings, it will be seen that it is my intention to provide a downward and rearward, upward and forward motion to the wings, with a view of simulating the action of a bird. To now effect this motion, a pair of arms 24 are provided, which arms extend beyond the fuselage to any desired length. The forward arm has associated with its outer end, one part 25 of a hinge.

A toggle is now provided, which toggle conveniently includes a pair of links 26 having their inner ends pivotally connected together, as at 27, which toggle is pivotally mounted adjacent one of the outer ends of said links to the rearmost arm 24, as has been indicated at 28. The opposite end of the toggle, i. e. the outer end of the opposite link, is pivotally secured, as at 29, adjacent the rear and inner edge of the main wing portion, hereinafter more fully specified, this wing portion being provided adjacent its forward and inner edges with a hinged part 30 adapted to co-operate with the hinged portion 25 to provide pivotal connection between the arm 24 and the wing.

It will be understood that a breaking and opening of the toggle comprising the links 26 will result in a movement on the main or outer portion of the wing 22, through the arc indicated in dotted lines in Figure 1.

Figures 2, 15:
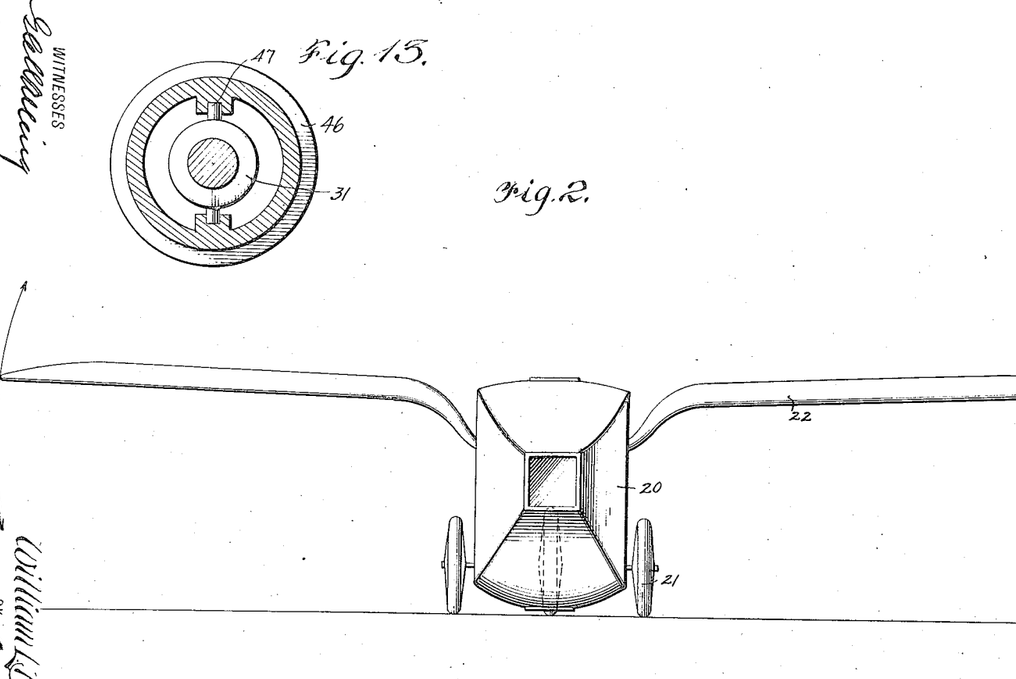
Figure 2 is a front view thereof.
Figure 15 is an enlarged sectional view taken along the lines 15—15 of Figure 14.
Figure 4:
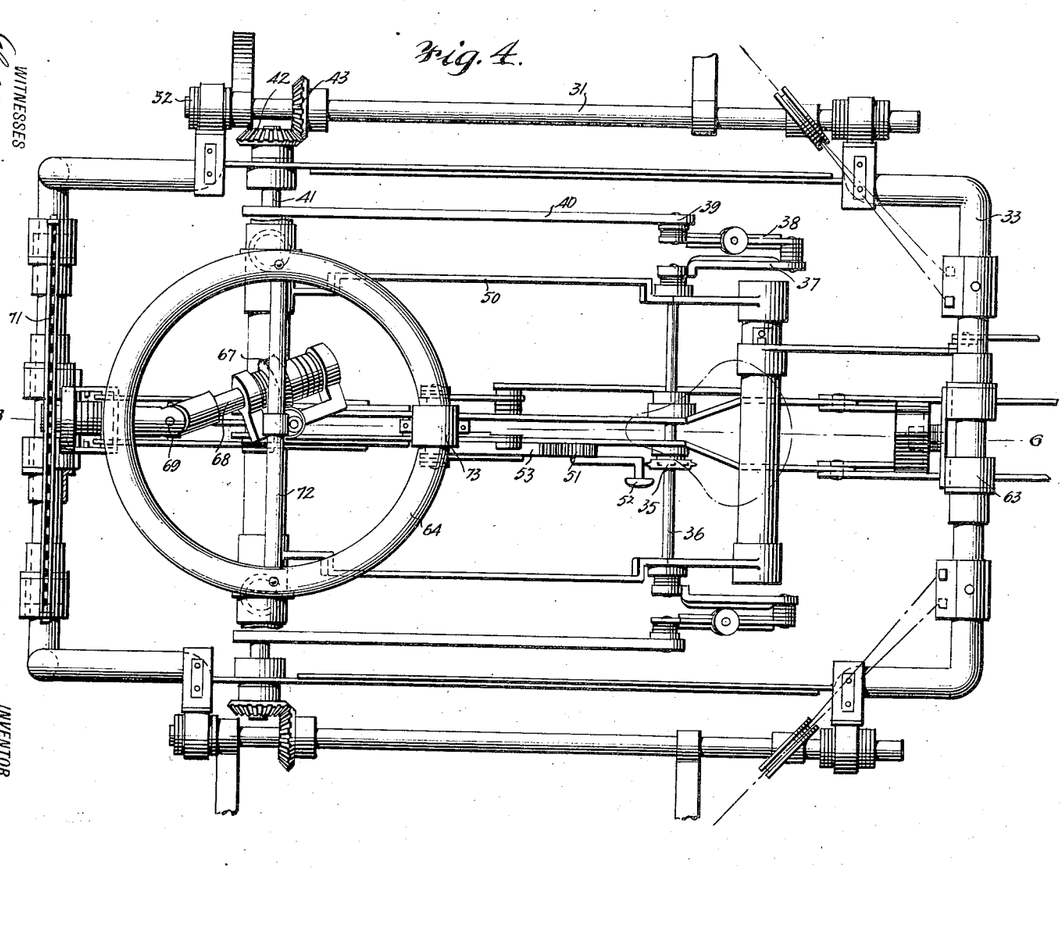
Figure 4 is an enlarged plan view of certain of the actuating and controlling mechanism.

To now permit the wings to oscillate in a vertical plane, it will now be noted that the inner ends of the arms 24 are affixed to a bar 31, which bar is journaled as at 32 in Figure 4 so that the same is capable of oscillation, which oscillation will result in an oscillation on the part of the wings 22 through the arc indicated in Figure 2.

Now with a view of having means which will serve to actuate the bar 31, to cause the result desired and which will permit of the movement in a horizontal plane illustrated in Figure 1, a framework 33 is provided, which framework may conveniently be rectangular in construction, the journals 32 being secured thereto, as has been clearly shown in Figure 4.

Figure 3:
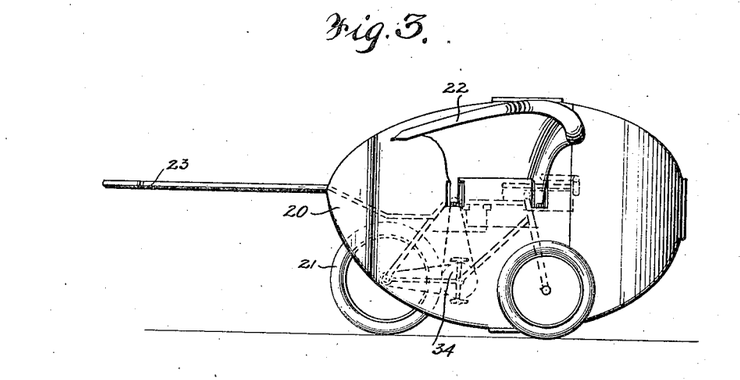
Figure 3 is a side view of my improved flying machine.
Figure 5:
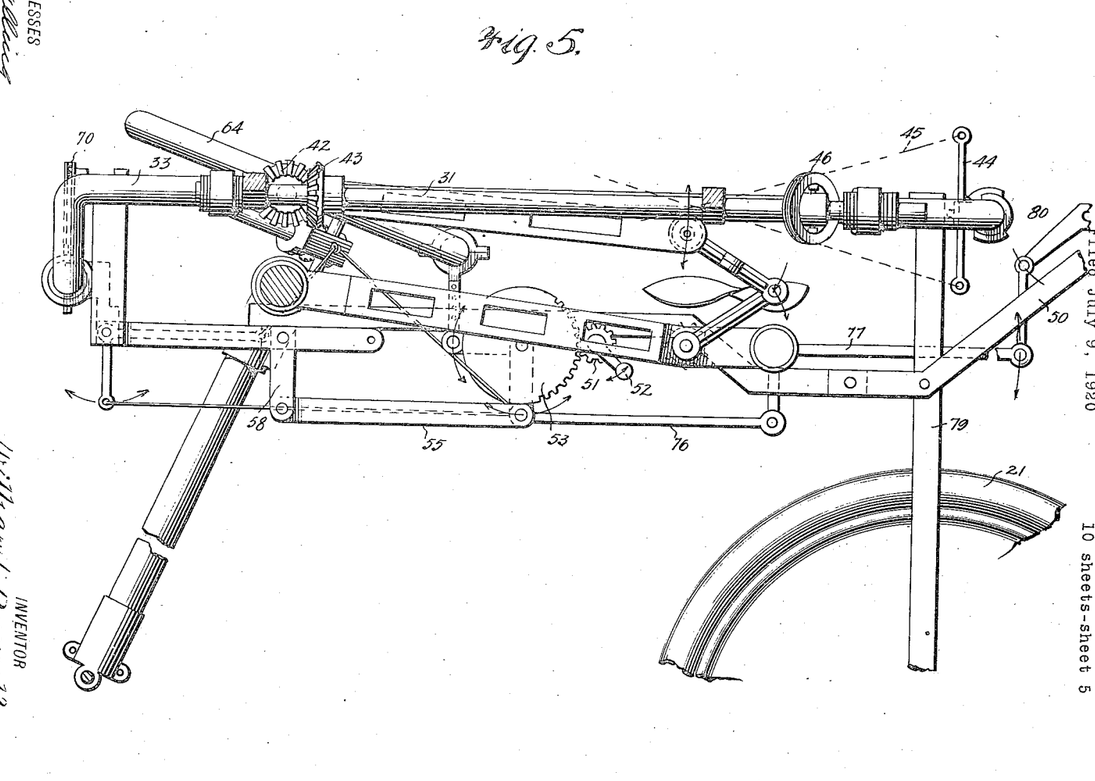
Figure 5 is a side view thereof.
Figure 6:
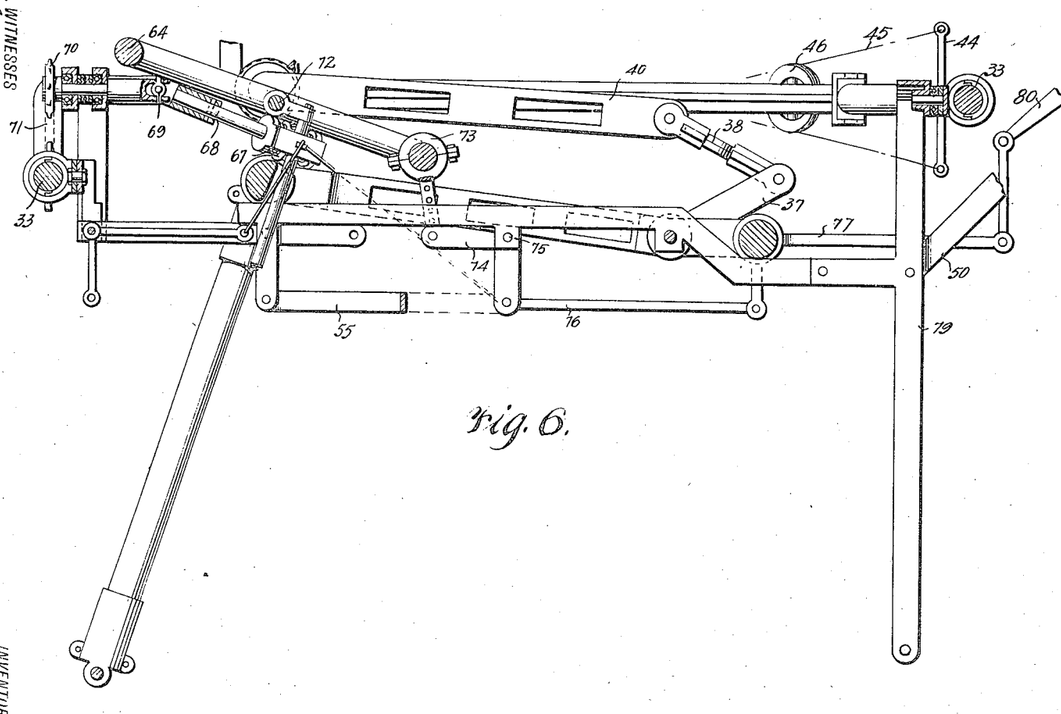
Figure 6 is a sectional side view of these parts taken along the lines 6—6 of Figure 4.

Reference is now had to Figures 3, 4 and 5, and it will be seen, referring to the former, that the landing gears aforedescribed, conveniently includes a rear wheel 21, which may be driven in the manner of an ordinary tricycle, by means of a sprocket chain transmission 34. This transmission further includes a sprocket chain which is adapted to mesh with a sprocket 35 rigidly secured to a shaft 36, rotatably mounted within the frame 33, which shaft is provided adjacent its end portions with cranks 37, so that an operation of the transmission 34 will result in a rotation of these cranks.

The cranks 37 have pitmans 38 associated with their outer ends, the opposite end of the pitmans being pivotally secured, as at 39, to one end of bars 40, which latter have their opposite ends fixed to a shaft 41 mounting gears 42, of any suitable type meshing with the gears 43 forming a part of the shaft 31.

Conveniently secured to the end of the frame 33 are pairs of arms 44 which latter have cables 45 associated with them the end of one of said cables being secured adjacent the point of pivotal connection 29 of the toggle, to the main portion of the wing, the end of the second cable being secured to the point of pivotal connection 27 of the links 26.

Thus it will be obvious, that an operation of the transmission 34 will result in an oscillation of the bars 40, causing a consequential rocking of the shafts 31, and a movement bodily of the wings in a plane indicated in dotted lines in Figure 2. This motion will naturally result in tension being exerted upon either of the cables 45, which latter pass over the grooved bearing member 46 illustrated in Figure 13, which is conveniently swingingly mounted, as at 47 upon the shaft 31, this tensioning resulting in an alternate breaking and opening of the toggle upon the wings being swung downward, and upwardly respectively, thus causing the movement illustrated in Figure 2.

It will be obvious that this combined movement will result in the wings moving bodily through the circle indicated in dotted lines in Figure 1, i. e. rearward and downwardly, and forward and upwardly, thus simulating the motion of a bird's wings.

Figure 14:
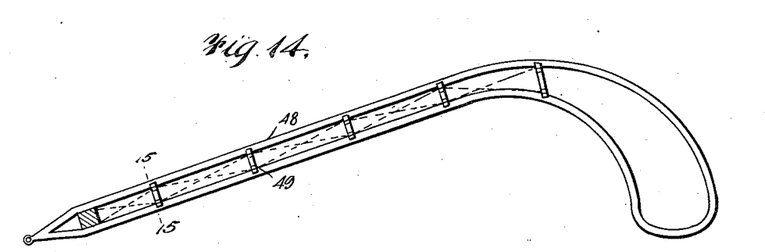
Figure 14 is a sectional view taken through a wing.

In this connection it is to be noted, reference being had to Figures 14 and 15, that the wings preferably include a hollow framework conveniently comprising pairs of spaced transverse braces 48 held in this position by interposed brackets 49, which wings are covered with any suitable material.

With a view now of providing means which will permit the angle of incidence of the wings to be varied so that sufficient momentum may be acquired to permit "taking off" from the ground, a sub-framework 50 is provided, which sub-framework incidentally forms a bearing for the shaft 36.

Secured to this latter framework, is a gear 51, which, by means of a crank handle 52, serves to rotate an enlarged gear 53, to which is secured an arm 54 having in turn one end of a link 55 pivotally associated with it, as at 56, the opposite end of said link being pivotally secured, as at 57 to an extension 58 of an arm 59 pivotally secured as at 60 to the subframe 50.

Swingingly secured as at 61 to the outer end of the arm 59 is a further link 62, which is associated with the frame 33. Thus, upon the crank 52 being rotated, a movement bodily on the part of the frame 33 with respect to the sub-frame 50 will result through the arc indicated in dotted lines in Figure 18, this action being caused by virtue of the fact that the subframe 50 is hingedly secured as at 63 in Figure 4 to the frame 33.

Figures 15, 16, 17, 18:
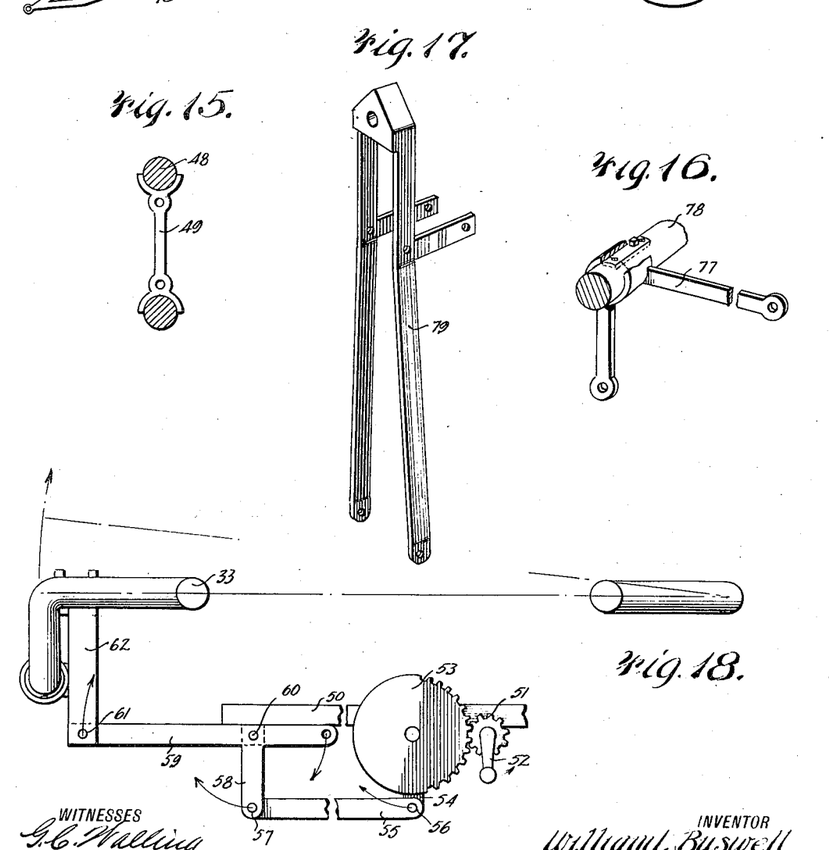
Figure 16 illustrates a detail of the tail moving mechanism.
Figure 17 is a perspective view of a certain type of bracket utilized as a part of the frame for the landing gear.
Figure 18 illustrates in detail, the mechanism permitting of a variation of the angle of the wings.

It will be obvious from the foregoing that the parts upon starting may lie in the position indicated in full lines in Figure 18, and that after sufficient momentum has been acquired by the actuation of the transmission 34 resulting in a driving of the wheel 21, that a crank 52 may be turned so that sufficient inclination of the wings is secured, which will result in a rising of the machine from the ground by virtue of the fact that the wings will have been moving in the manner aforedescribed during the operation of the transmission 34.

Figure 7:
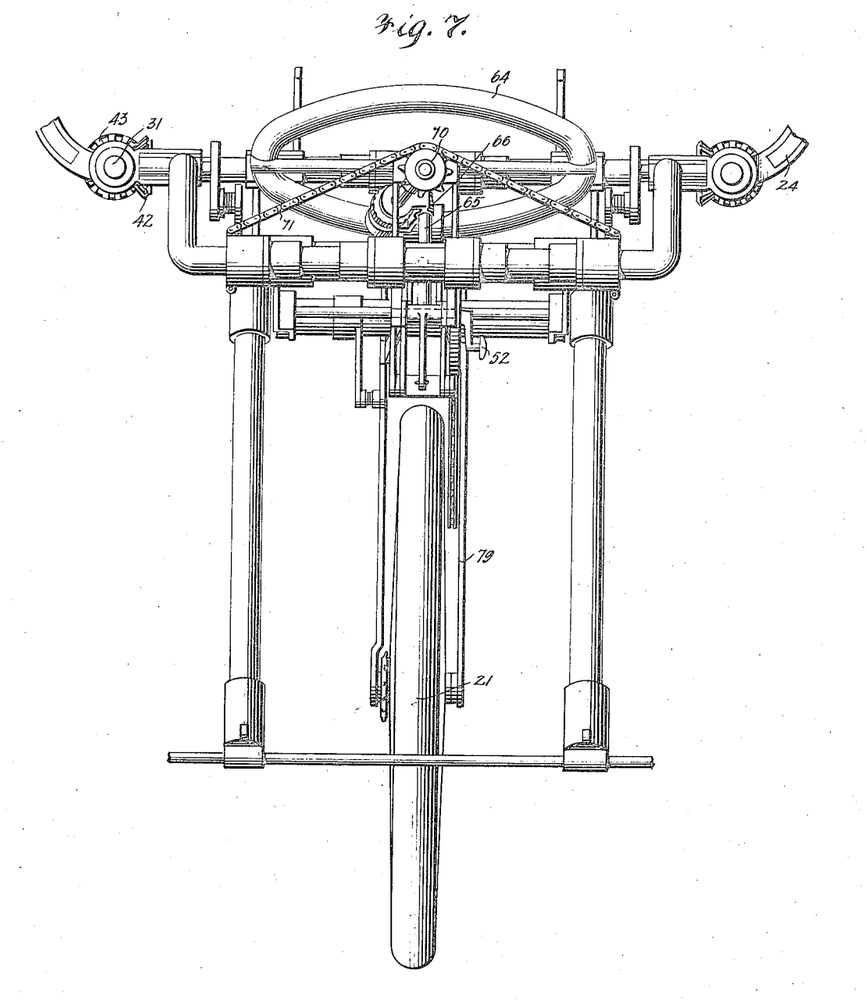
Figure 7 is a front view of the device as shown in Figures 4 to 6.

With a view now of providing means which will permit of a "banking" of the machine, attention is more particularly invited to Figures 4 and 7, and it will be seen upon an extension of the parts illustrated in these figures that the frame 33 also carries the control wheel 64, which latter serves to actuate a shaft 65, carrying a worm 66, in turn meshing with a worm gear 67, so that upon the control wheel 64 being rotated, a rotation of the shaft 68 carrying the gear 67 will result, which latter, by virtue of the universal coupling 69 will serve to rotate a sprocket 70.

A sprocket chain 71, has its ends fixed to the frame 33, its body portion passing over the sprocket 70, and it will be obvious that a rotation of the sprocket 70 will result in an inclination of the frame 33 with respect to the plane in which it is traveling, resulting in a swinging of the frame in an arc, thus producing the "bank" desired without the necessity of resorting to ailerons.

To provide means which will permit of an elevation or depression of the tail, and consequently the entire machine, the control wheel 64 is mounted by means of the shaft 72 so as to be capable of rocking. A collar 73 encircles the wheel 64, and is pivotally connected with a bell crank 74 pivoted as at 75. A link 76 has one of its ends rockingly secured to the opposite end of the bell crank 74, its opposite end being associated with a second bell crank 77, more particularly shown in Figure 16, which bell crank is movably mounted upon a bar 78 forming a part of the subframe 50.

The opposite end of this bell crank now passes to right of forks 79 of the bracket, which serves to support the rearmost of the wheels 22 and serves, by means of the extension 80 of the tail 23 to rock the same around the pivot 81, which affords a mounting therefor.

It will thus be understood, that it will only be necessary to rock the control wheel 64 with respect to the shaft 72 to incline the tail 23 in the manner desired.

Obviously numerous modifications of structure might readily be resorted to without in the least departing from the spirit of my invention, which I claim as—

Having thus described my invention, what I claim as new and desire to secure by Letters Patent is as follows;—

1. In a flying machine, the combination of a fuselage, a frame located within said fuselage, an oscillating shaft revolubly supported within said fuselage, crank arms connected with said shaft, a plurality of pitmans connected with said crank arms, bars connected with said pitmans at the outer ends thereof, a shaft connected with each of said bars, gearing connected with said last mentioned shaft and with said oscillating shaft, arms extending from each of said oscillating shafts, wings movably connected with said arms, and an independent operated control for moving said wings bodily in a predetermined plane while said wings are being moved by means of said shafts in a different plane crossing said first mentioned plane.

2. In a heavier-than-air flying machine, a fuselage, a pair of wings and an elevator for said fuselage, a frame, a plurality of wheels secured to said frame for supporting said machine on the ground, a seat mounted in said fuselage for accommodating an operator, foot actuated means connected to one of said wheels for moving said machine on the ground, and means connecting said foot operated means to both of said wings for moving the same in a vertical plane, and means for causing said wings to move in a horizontal plane simultaneously with their vertical movement.

3. In a heavier-than-air flying machine, the combination of a fuselage pivotally mounting a plurality of wings, a tail for said fuselage, a foot operated mechanism located within said fuselage, means connecting said foot operated mechanism to said wings for rocking the latter vertically, means for rocking said wings horizontally during the vertical movement, and further means located within the fuselage and connected to both the tail and the wings for controlling said machine, said last mentioned means comprising a control capable of actuating said wings when the same are moving.

4. In a flying machine of the character described, a fuselage, a pair of wings and an elevator for said fuselage, foot power means located within said fuselage and connected to said wings whereby the latter are oscillated vertically, means for rocking said wings horizontally during the vertical movement for propelling the machine through the air, and a control located within said fuselage for shifting said wings in a vertical plane and thereby causing a banking of said machine and controlling the same horizontally.

5. In a flying machine of the character described, a fuselage, a plurality of wings and a tail for said fuselage, a plurality of wheels supporting said fuselage when on the ground, a foot operated mechanism located within said fuselage and connected to one of said wheels, an oscillating member actuated by said wheel and connected to said wings for oscillating the latter, and means located within said fuselage for changing the plane of said wings with respect to said fuselage for obtaining the horizontal control of the machine.

WILLIAM LOUIS BUSWELL.